Sept. 19, 1950  E. DALAND  2,523,197
HELICOPTER
Filed May 22, 1947
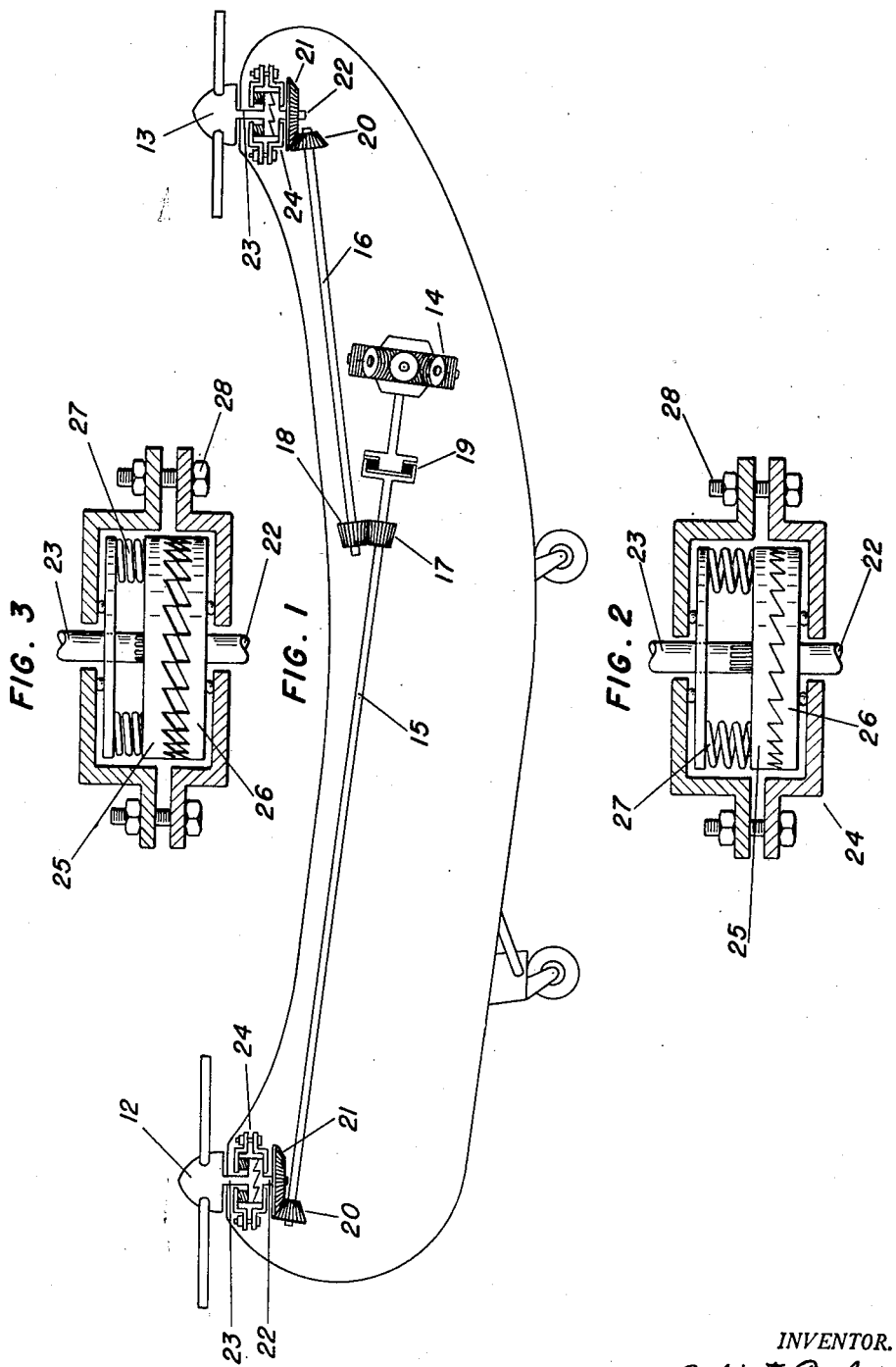
INVENTOR.
Elliot Daland Patented Sept. 19, 1950

2,523,197

UNITED STATES PATENT OFFICE 2,523,197

HELICOPTER

Elliot Daland, Wallingford, Pa., assignor, by mesne assignments, to Piasecki Helicopter Corporation, Sharon Hill, Pa.

Application May 22, 1947, Serial No. 749,811

7 Claims. (Cl. 170—135.2)

This invention relates to rotary wing aircraft and more particularly to means for equalizing the lift of rotors in autorotation.

In designing helicopters having more than one rotor, it is necessary to provide an overrunning clutch between the power plant and the drive system. This location of the overrunning unit is required as under certain conditions of autorotative flight one of the rotors may tend to autorotate faster than the other rotor or rotors causing an unbalance of lift forces about the center of gravity of the machine. With the overrunning unit located between engine and the drive system, the rotors are positively connected together by a drive shaft and any tendency for one rotor to rotate faster than the others will cause the faster rotor to drive back power through the drive system to the other rotors, thus equalizing the speed of all rotors.

The above described system takes care of power plant failure, but in the event of drive system failure if one of the rotor transmissions or drive shafts should become locked or jammed, the entire rotor system would stall.

It is therefore one of the principal objects of this invention to provide overrunning means at each rotor which are normally inoperative so as to allow any one of the rotors to drive back a predetermined amount of power to the other rotors when the power plant has failed and there exists a difference of lift between the rotors and yet is so designed that if any part of the drive system should bind up, the overrunning means will operate to allow the rotors to overrun the drive system.

This invention will better be understood when the following specifications are read in conjunction with the accompanying drawings in which Figure 1 is an elevational view of a tandem rotor helicopter provided with my invention. Figure 2 is a detailed view of the rotor overrunning clutch shown in driving engagement. Figure 3 is a detailed view of the rotor overrunning unit shown in overrunning position.

In Figure 1 of the drawings there is shown a helicopter comprised of a fuselage 11 on which are mounted at the fore and aft ends thereof rotors 12 and 13. The front rotor 12 is driven by a power plant 14 which is connected by a drive shaft 15. Power is transmitted to the rear rotor 13 by a drive shaft 16 geared to the drive shaft 15 by gears 17 and 18. An overrunning clutch 19 is shown as part of the drive shaft 15 and it will be noted that the unit 19 is positioned in the system in such a manner that the rotors 12 and 13 may overrun the engine 14 in case of power plant failure without breaking the driving connection existing between the rotors 12 and 13.

Each rotor is provided with a speed reducing transmission comprised of a pinion gear 20 fixed to the drive shaft and meshing with beveled gear 21 fixed to the rotor shaft. The rotor shaft of each rotor is comprised of two sections, a lower section 22 and an upper section 23. The lower section 22 drives the upper section 23 through a rotor clutch or ratchet drive 24. The upper part 25 of the ratchet drive is slidably carried on the rotor shaft 23 so that it may move out of engagement with the lower portion 26 of the ratchet drive when the lower drive shaft 22 stops rotating.

In order to prevent the rotor clutch 24 from allowing the rotor to overrun the drive system in case of power plant failure, the upper section 25 is held in engagement with the lower section 26 by means of springs 27, the pressure of which can be adjusted by tightening or loosening the bolts 28. Adjustment of the drive back torque through the rotor clutches 24 can be made by the pilot by providing suitable torque transmitting means between the cockpit and the bolts 28.

It is now evident that in the event of power plant failure should the rotor 13 tend to overrun the rotor 12 or vice versa, the slower rotor will be driven by the faster rotor unless the drag in the drive system is equal to or greater than the friction produced by the springs 27 on the beveled side of the ratchet teeth of the rotor clutch in which case the rotor clutch 24 will disengage, thus permitting the rotors to overrun the drive system and allow the rotors to continue in autorotation.

It is well understood that certain changes could be made in the arrangement and form of the parts described in the above description and shown in the accompanying drawings without departing from the principle of the present invention as comprehended within the scope of the appended claims.

I claim:

1. In combination, a multi-rotor helicopter provided with a power plant, means to equalize the lift of the several rotors when in autorotation, said means being comprised of drive shafts connecting the several rotors in driving engagement and an overrunning clutch between the drive shafts and the power plant, clutches provided with means to transmit torque in both directions interposed between the drive shafts and each rotor, through which one rotor may drive the other, the torque transmitted by the rotors through said last mentioned clutches being limited by an adjustable spring loading means.

2. A helicopter having two or more sustaining rotors capable of autorotation, a drive system comprised of power transmitting shafts connecting said rotors in driving engagement with each other, said rotors being driven by a common power plant connected with said drive system, each rotor being provided with an overrunning clutch between it and the drive system connecting it with the other rotor or rotors, an overrunning clutch between said power plant and said drive system, said first mentioned clutches including adjustable means to transmit torque from the rotor back to the drive system when the drive system is overrunning the power plant.

3. In combination, a helicopter provided with two or more rotors, a power plant, a drive system interconnecting said rotors and driven by said power plant, an overrunning clutch between said drive system and said power plant, overrunning clutches interposed between each of said rotors and said drive system, said last mentioned clutches including means to transmit a predetermined amount of torque from any of said rotors to said drive system to equalize the speed of said rotors in autorotative flight, said means also including adjustable means to regulate the amount of torque transmitted from any of said rotors to said drive system.

4. A helicopter comprising, in combination, two or more rotors, a common power plant, a drive system interconnecting said rotors and driven by said power plant, an overrunning clutch interposed between said drive system and said power plant, overrunning clutch means interposed between each of said rotors and said drive system, said overrunning clutch means including means to transmit sufficient torque from said rotors to said drive system to equalize the autorotative speed of said rotors.

5. A helicopter comprising multiple rotative sustaining means, a common power plant, a drive system interconnecting said sustaining means and driven by said power plant, an overrunning clutch interposed between said drive system and said clutch, means to permit said sustaining means to overrun the drive system and including means to transmit torque from said sustaining means to said drive system to equalize the speed of the sustaining means when the drive system is overrunning the power plant.

6. In a multi-rotor helicopter comprising in combination two or more sustaining rotors, a common power plant, a drive system operatively connected with each of said rotors and said power plant, said drive system interconnecting the rotors to transmit power from rotor to rotor, an overrunning clutch interposed between said drive system and said power plant, said overrunning clutch permitting said drive system to equalize the rotative speed of the rotors when the power plant is operating at a slower speed than the drive system, means interposed between each of said rotors and said drive system to transmit torque from said drive system to said rotors, said means also including means to transmit sufficient torque from said rotors to said drive system to equalize the speed of the several rotors, said means also including means to permit said rotors to overrun the drive system.

7. In multi-rotor helicopter, in combination, two or more sustaining rotors, a power plant, means to transmit torque from said power plant to said rotors, said means also transmitting torque from rotor to rotor, an overrunning clutch between said power plant and said torque transmitting means, said overrunning clutch permitting said rotors and torque transmitting means to overrun the power plant, a clutch between each of said rotors and said torque transmitting means, each of said clutches normally acting to transmit torque from said torque transmitting means to each of said rotors, said clutches including means to transmit sufficient torque from said rotors to said torque transmitting means to equalize the speed of the several rotors, said clutches also including means to permit the rotors to overrun the torque transmitting means.

ELLIOT DALAND.

REFERENCES CITED

The following references are of record in the file of this patent:

UNITED STATES PATENTS

| Number | Name | Date |
|---|---|---|
| 2,023,105 | Smith | Dec. 3, 1935 |
| 2,330,842 | Pullin | Oct. 5, 1943 |
| 2,337,571 | Pullin | Dec. 28, 1943 |
| 2,414,766 | Platt | Jan. 21, 1947 |